United States Patent
Yeo et al.

(10) Patent No.: US 7,551,643 B2
(45) Date of Patent: Jun. 23, 2009

(54) METHOD FOR SETTING USER EQUIPMENT IDENTIFIER IN RADIO COMMUNICATION SYSTEM

(75) Inventors: Woon Young Yeo, Kunpo (KR); Seung June Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 835 days.

(21) Appl. No.: 10/191,260

(22) Filed: Jul. 8, 2002

(65) Prior Publication Data

US 2003/0007510 A1 Jan. 9, 2003

(30) Foreign Application Priority Data

Jul. 7, 2001 (KR) ............... 2001-40710

(51) Int. Cl.
*H04J 3/22* (2006.01)
(52) U.S. Cl. ...................... 370/469; 370/328
(58) Field of Classification Search ................ 370/469, 370/328, 471, 475, 476, 329
See application file for complete search history.

(56) References Cited

U.S. PATENT DOCUMENTS

| | | | | |
|---|---|---|---|---|
| 6,782,274 | B1 * | 8/2004 | Park et al. ................. | 455/552.1 |
| 6,862,450 | B2 * | 3/2005 | Mikola et al. ............... | 455/438 |
| 6,898,429 | B1 * | 5/2005 | Vialen et al. ............... | 455/432.1 |
| 2001/0018345 | A1 * | 8/2001 | Longoni et al. ............. | 455/436 |
| 2002/0025815 | A1 * | 2/2002 | Rune et al. .................. | 455/436 |
| 2002/0168984 | A1 * | 11/2002 | Wallentin ................... | 455/452 |

FOREIGN PATENT DOCUMENTS

WO   WO 00/54536   9/2000

OTHER PUBLICATIONS

ETSI TS 125 321 V3.8.0, "Universal Mobile Telecommunications System (UMTS)", Jun. 2001, pp. 1-42 (1999).
ETSI TS 125 322 V3.7.0, "Universal Mobile Telecommunications System (UMTS)", Jun. 2001, pp. 1-58 (1999).
3rd Generation Partnership Project; Technical Specification Group Radio Access Netowr; MAC protocol specification (Release 1999), Jun. 2001, 3GPP TS 25.321 V2.9.0, p. 8-27.
LG Electronics, UE-ID type indicator, 3GPP TSG RAN WG2 Meeting #25, Nov. 26, 2001, R2-012540. p. 1-5.
LG Electronics, UE-ID type indicator, 3GPP TSG RAN WG2 Meeting #25, Nov. 26, 2001, R2-012738. p. 1-5.
Siemens AG, Setting of UE Id in MAC, 3GPP TSG RAN WG2 #22, Jun. 9, 2001, R2-011676, p. 1-6.

* cited by examiner

*Primary Examiner*—Brian D Nguyen
(74) *Attorney, Agent, or Firm*—Lee, Hong, Degerman, Kang & Waimey

(57) ABSTRACT

The present invention is directed to a method for setting a user equipment identifier as user equipment identification information used when data received through a dedicated logical channel is transmitted through a common transport channel. The method includes transmitting data and a message type indicator as user equipment identification information from a RRC layer to an RLC layer; setting a user equipment identifier indicator according to the received message type indicator in the RLC layer and transmitting it with the data to a MAC layer; and selecting a user equipment identifier type and a user equipment identifier according to the set user equipment indication identifier, adding it to a header of a MAC SDU in the MAC layer and transmitting it to a corresponding MAC layer in a receiving device.

13 Claims, 6 Drawing Sheets

RELATER ART

RELATER ART

RELATER ART

RELATER ART

METHOD FOR SETTING USER EQUIPMENT IDENTIFIER IN RADIO COMMUNICATION SYSTEM

CROSS REFERENCE TO RELATED ART

This application claims the benefit of Korean Patent Application No. 2001-40710, filed on Jul. 7, 2001, which is hereby incorporated by reference in its entirety.

BACKGROUND OF THE INVENTION

1. Field of the Invention

The present invention relates to a method for setting a terminal(user equipment) identifier in a mobile communication system as terminal (user equipment) identification information, when data delivered through a dedicated logical channel is transmitted through a common transport channel. More specifically, it relates to a method for setting a user equipment identifier in a UMTS (Universal Mobile Telecommunications System, European type IMT-2000 radio communication system). As data (RLC SDU; Radio Link Control Service Data Unit) and message type indicator, which serve the purpose of user equipment identification information, are transmitted from a RRC (Radio Resources Control) layer to an RLC (Radio Link Control) layer, the RLC layer sets a user equipment identifier indicator according to the transmitted message type indicator and transmits it with the data to a MAC (Medium Access Control) layer. In turn, the MAC layer adds the appropriate user equipment identification information to the data received.

2. Description of the Related Art

For the purpose of making specifications for third generation mobile communication systems (IMT-2000 systems) based on evolved GSM core network and W-CDMA radio access network and specifications for user equipment for the system, a group of standard developing organizations (SDOs) including ETSI of Europe, ARIB/TTC of Japan, T1 of U.S. and TTA of Korea established a unified SDO in the name of Third Generation Partnership Project ("3GPP"). 3GPP is developing third generation mobile communication systems (IMT-2000 system) providing high performance multimedia services including audio, video and data over a radio network.

For the purpose of efficient management and technological development, five Technical Specification Groups ("TSGs") are organized under 3GPP. Each TSG is in charge of approving, developing and managing specifications related to a pertinent field. Among them, RAN (Radio Access Network) group has developed functions, requirements and interface specifications related to user equipment and UMTS (Universal Mobile Telecommunications System, European type IMT-2000 System) Terrestrial Radio Access Network ("UTRAN") in order to set a new radio access network specification to the third generation mobile communication system.

A TSG-RAN group consists of one plenary group and four working groups. WG1 (working group 1) has been developing specifications for a physical layer (first layer), and WG2 has been specifying functions of a data link layer (second layer) and a network layer (third layer). In addition, WG3 has been developing specifications for interfaces among base stations, RNCs (Radio Network Controller) and core networks in the UTRAN. Lastly, WG4 has been discussing requirements for radio link performance and radio resource management.

FIG. 1 illustrates a structure of the UTRAN.

As depicted in FIG. 1, the UTRAN 20 includes a Node B and an RNC. Node B is controlled by the RNC, and works as an access point by receiving uplink information from the user equipment 10 and by transmitting downlink information from the UTRAN through the physical layer linking. The RNC performs allocation and management of radio resources.

The RNC can be classified as either control or serving RNC. First, the control RNC directly manages Node B and manages common radio resources. Next, the serving RNC manages dedicated radio resources allocated to each user equipment.

The control RNC and the serving RNC can be the same. However, when a user equipment moves from a serving RNC's region to other RNC's regions, a control RNC and a serving RNC can be different.

Accordingly, when the control RNC and the serving RNC are different, data to be transmitted to a user equipment is transmitted to a control RNC after passing through a serving RNC and transmitted to a user equipment through a Node B connected to the control RNC.

As depicted in FIG. 1, a Radio Network Sub-system ("RNS") includes one RNC and several Node Bs. In addition, the RNS where a serving RNC is located is referred to as serving RNS.

FIG. 2 illustrates a structure of a general radio interface protocol according to a radio access network specification of the 3GPP.

A radio interface protocol between a user equipment and the UTRAN is horizontally divided into a physical layer (first layer), a data link layer (second layer) and a network layer (third layer). It is also vertically divided into a control plane for control signaling and a user plane for data information transfer.

As to the vertical division, first, the control plane contains a radio resource control ("RRC") layer, a radio link control ("RLC") layer, a medium access control ("MAC") layer and a physical layer as the first layer. Next, the user plane contains a packet data convergence protocol ("PDCP") layer, a broadcast/multicast control ("BMC") layer, an RLC layer, a MAC layer and a physical layer.

The physical layer provides information transfer service to an upper layer by using various radio transfer techniques. It is connected to the MAC layer as an upper layer through transport channels. The data between the MAC layer and the physical layer are transmitted through the transport channels. The transport channels are classified as a DTCH (Dedicated Transport Channel) and a CTCH (Common Transport Channel). The DTCH is a transport channel exclusively used by one user equipment, and the CTCH is a transport channel jointly used by several user equipment.

The MAC layer provides a reallocation service of a MAC parameter for allocating and reallocating radio resources. It is connected to the RLC layer through a logical channel, and various logical channels are provided according to the type of information transmitted. In general, a control channel is used when transmitting information on the control plane, and a traffic channel is used when transmitting information on the user plane.

The RLC layer provides the function of setting and releasing radio links. In addition, it performs segmenting and reassembling functions of an RLC Service Data Unit ("SDU") delivered from an upper layer on the user plane. The size of the RLC SDU is adjusted on the RLC layer to be suitable for a processing capacity. Afterwards, header information is added, and it is transmitted to the MAC layer as an RLC Protocol Data Unit ("PDU") format.

Since the PDCP layer is an upper layer of the RLC layer, it converts the data of packet network protocols, such as IPv4 or IPv6, into the data of a format suitable for the RLC layer, and vice versa. In addition, it assists the lower layers to transfer data through the radio interface efficiently by reducing unnecessary control information used in a wire network. That function is referred to as header compression, and, for example, the header compression can be used to reduce TCP/IP header information.

The BMC layer exists on the user plane, and it is used for applying a broadcast service or a multicast service to the system having a radio interface.

The RRC provides information broadcast services to all user equipment located within a certain area. In addition, it performs a control plane signal processing for a control signal exchanging between the third layers of transmitting and receiving side and has functions for setting/maintaining/releasing radio resources between user equipment and the UTRAN. In particular, the RRC has functions for setting/maintaining/releasing a Radio Bearer and allocating/reconfiguring/releasing radio resources required for radio access networking. Herein, the Radio Bearer means a service provided by the second layer for data transfer between the user equipment and the UTRAN. That is, setting a radio bearer means specifying the characteristics of a protocol layer and a channel required to provide a certain services, and setting specific parameters and operation method.

Each user equipment also includes all radio interface layers. However, in the UTRAN, protocol layers are dispersed in several constituent elements of a UTRAN (UMTS Terrestrial Radio Access Network).

FIG. 3 illustrates an example of a protocol layer hierarchy corresponding to the constituent elements of a Radio Access Network. In general, the RLC layer is placed in the serving RNC. The functions of the MAC layer can be divided according to the type of a transport channel and can be placed either in the serving RNC or in the control RNC.

As depicted in FIG. 3, when two RNCs are operated concurrently as a serving RNC and a control RNC, the MAC layer is divided into a MAC-d sub layer and a MAC-c/sh sub layer according to the type of transport channel. These are respectively placed in the serving RNC and the control RNC.

In comparison, when one RNC is operated commonly as the serving RNC and the control RNC, a MAC-c/sh sub layer and a MAC-d sub layer are placed on the same RNC. This is because the MAC-d sub layer manages a dedicated logical channel, which is dedicated to a user equipment, and the MAC-c/sh sub layer manages a common transport channel. Because the MAC-s/sh sub layer manages the common transport channel, which is jointly used by all user equipment within the cell, each cell has one MAC-c/sh layer. Because the MAC-d sub layer provides a dedicated service to a user equipment, and one MAC-d sub layer exists for each one user equipment. The physical layer (PHY) is placed in the Node B.

FIG. 4 illustrates a structure of an RLC layer and a MAC layer in the UTRAN. In a down_link, when data is delivered to the RLC layer from an upper layer, the RLC layer stores an RLC PDU in an RLC buffer and transmits a certain number of PDUs corresponding to a request from the MAC layer.

The RLC PDU received in the MAC-d layer is transmitted through Dedicated Transport Channel (DTCH) or Common Transport Channel (CTCH) by channel switching. When it is transmitted through DTCH, a related header is added to it in the MAC-d sub layer, and it is transmitted to the physical layer through a Dedicated Channel (DCH).

However, the RLC PDU is transmitted through the CTCH, it is transmitted from the MACd sub layer to the MAC-c/sh sub layer, and a related header is added on. Thereafter, it is multiplexed through other logical channels and is transmitted through the common transport channel such as PCH (Paging Channel), FACH (Forward Access Channel) and DSCH (Downlink Shared Channel) etc.

In an up_link, data is received through the Dedicated Channel (DCH) and the common transport channel (CTCH) such as RACH (Reverse Access Channel) and CPCH (Common Packet Channel) etc., and the data is subsequently transmitted to an upper layer.

In that case, the data is transmitted to the RLC layer via the path converse in the down_link. The structures of the RLC layer and the MAC layer in the user equipment are almost the same as the structure in FIG. 4.

To illustrate, the transmission of data through FACH (Forward Access Channel) as the common transport channel will be described with reference to FIG. 4.

Because the RLC PDU transmitted from the RLC layer uses the FACH of the MAC-c/sh sub layer, it is transmitted to the MAC-c/sh sub layer through channel switching and control transmission multiplexing. The control transmission multiplexing means multiplexing several logical channels.

Data transmitted to the MAC-c/sh sub layer is multiplexed with data of other logical channels. In addition, because the data of various user equipment can be transmitted through the common transport channel, to identify a user equipment to receive pertinent data, a destination user equipment's identifier is added to the MAC PDU through a user equipment identifier inserting for data multiplexing. Herein, a TCTF (Target Channel Type Field) mapping for data multiplexing maps the relationship between the logical channel and the transport channel. Data mapped by the FACH transport channel is transmitted to the FACH based on a data transmission schedule by considering the priority of the user equipment.

The RLC PDU delivered from the RLC layer of the UTRAN or the user equipment to the MAC layer through the logical channel is transmitted to the physical layer through an appropriate transport channel.

Herein, when the data passed the dedicated logical channel is transmitted through the common transport channel as described above, it passes through the MAC-d sub layer and the Mac-c/sh sub layer and ultimately transmitted to the physical layer.

In that case; MAC PDU header information, which is added by each part of the MAC layer, can include a TCTF field, a user equipment identifier type field, a user equipment identifier field and a C/T field etc.

The TCTF field indicates the following: the type of a logical channel the data of which is transmitted through a specific transport channel; the user equipment identifier type field indicating which user equipment identifier among various types of user equipment identifiers is used; the user equipment identifier field including identification information of a user equipment designated in the user equipment identifier type field; and the C/T field which provides information for distinguishing each logical channel when data of several logical channels are transmitted to one transport channel.

A user equipment identifier, used for identifying a user equipment on the MAC-c/sh sub layer shown in FIG. 4, can be divided into two types according to a user equipment's distinguishable geographical region (i.e. a range in which each user equipment can cover) in a network.

First, a C-RNTI (Cell Radio Network Temporary Identity) is allocated by the control RNC when a user equipment is linked to a new cell. Accordingly, the C-RNTI has unique value only in a pertinent cell, and a cell region is the effective region of the C-RNTI. Therefore, when the user equipment moves to another cell, the C-RNTI has to be changed.

Second, a U-RNTI (UTRAN Radio Network Temporary Identify) is used for identifying a certain user equipment in the UTRAN, and it is composed of a S-RNTI (SRNC RNTI) and a serving RNC identifier. The S-RNTI is an identification value used for identifying a certain user equipment in the serving RNC, and each user equipment has a unique S-RNTI value in the serving RNC. In addition, the serving RNC identifier is used to identify the RNC in the UTRAN. Accordingly, in order to designate a certain user equipment in the UTRAN, serving RNC identifier information and an identification value of the user equipment in the pertinent RNC are required.

Accordingly, the U-RNTI is a unique value in the UTRAN and is not changed even in cases where the use equipment is moved to a different cell in a RNS. However, when the serving RNC identifier is changed due to the change of the serving RNC, a new U-RNTI value has to be allocated. More specifically, a U-RNTI effective range is a region managed by a serving RNC.

In a system compliant with the 3GPP standard, a user equipment is identified by using only one of the two types of user equipment identifier: with the C-RNTI, a 16 bit is required, and with the U-RNTI, a 32 bit is required. Accordingly, by using C-RNTI the limited radio channel resources can be efficiently used. In some cases, a value of the U-RNTI is used. For example, when a C-RNTI value is changed frequently, a user equipment can be identified effectively by using a U-RNTI value.

However, in the conventional system compliant with the 3GPP standard, identification information of a user equipment is added to a MAC PDU by the MAC layer of the transmitter side, and the identification information of the user equipment is identified in the receiver side of the MAC layer. Though, the transmitter side MAC layer performs multiplexing of an RLC PDU transmitted from the RLC layer and adding identification information of a user equipment to a MAC PDU(a data unit corresponding to the RLC PDU), the MAC layer is unable to recognize when and which type of user equipment identifier is used, and can not change the type of user equipment identifier dynamically.

SUMMARY OF THE INVENTION

In order to facilitate in determining when and which type of a user equipment identifier must be used in a MAC layer, a method for determining information required for setting a user equipment identifier (C-RNT, U-RNTI) from other layers to a MAC (Medium Access Control) layer and a method for setting a user equipment identifier value are explained below.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To further illustrate, when data received through a dedicated logical channel is transmitted through a common transport channel, it is necessary to distinguish a user equipment which is the destination of the data by using a user equipment identifier in the MAC layer. Thus, a method for setting a user equipment identifier, which is to be added to a MAC PDU header, is provided below.

The steps in setting a user equipment identifier with the present invention are as follows: 1) transmitting data and a message type indicator as user equipment identification information from a RRC (Radio Resources Control) layer to an RLC (Radio Link Control) layer; 2) setting a user equipment identifier indicator according to the received message type indicator in the RLC layer and transmitting it with the data to a MAC (Medium Access Control) layer; 3) selecting a user equipment identifier type and a user equipment identifier according to the set user equipment indication identifier, adding it to a header of a MAC PDU (Medium Access Control Protocol Data Unit) in the MAC layer; and 4) transmitting it to a reception side MAC layer. (A MAC PDU is composed of a header and a MAC SDU. MAC SDU is substantially the same as RLC PDU.) The method further includes: performing a radio transmission in the MAC layer as a MAC PDU (Medium Access Control Protocol Data Unit) format; adding a user equipment identifier type field indicating a user equipment identifier field and the type of a user equipment identifier to the MAC PDU header; and transmitting it to the reception side and distinguishing a user equipment by using the MAC PDU header information in the reception side.

The RLC layer receives data (RLC SDU) and a message type indicator as user equipment identification information from the RRC layer and sets a user equipment identifier indicator for distinguishing a user equipment appropriate to a network region managing the user equipment in a mobile communication system. The MAC layer receives the user equipment identifier indicator designating the type (U-RNTI, C-RNTI) of user equipment identifier, and the MAC layer sets user equipment identifier and a user equipment identifier type field as MAC PDU header information.

The type of a user equipment identifier is determined when setting the radio bearer, and the set user equipment identifier indicator is transmitted from the RLC layer to the MAC layer in a transmission session using the set radio bearer.

The user equipment identifier indicator is updated by control information on the RRC layer when the type of user equipment identifier is changed.

The type of user equipment identifier is set according to the type of data (RLC SDU) transmitted from the RRC layer to the RLC layer.

According to an embodiment of the present invention, a method for setting a user equipment identifier in a radio communication system having a plurality of protocol layers comprises: providing data and a parameter associated with a user equipment identifier type indicator from a third protocol layer to a second protocol layer, wherein the third protocol layer is an upper protocol layer than the second protocol layer; providing the user equipment identifier indicator and the data from the second protocol layer to a first protocol layer; and adding in the first protocol layer a user equipment identifier type and a user equipment identifier to a first protocol layer data packet in response to the user equipment identifier indicator.

According to one aspect of the present invention, the third protocol layer is preferably a radio resource control (RRC) layer, the second protocol layer is preferably a radio link control (RLC) layer, and the first protocol layer is preferably a medium access control (MAC) layer.

According to another aspect of the present invention, the first protocol layer data packet is an MAC service data unit (SDU). In addition, a MAC protocol data unit (PDU) comprises the MAC SDU and the user equipment identifier.

According to another aspect of the present invention, the user equipment identifier indicator is associated with at least one of cell radio network temporary identity (C-RNTI) and UTRAN radio network temporary identity (U-RNTI). The MAC layer receives the MAC SDU and the user equipment identifier indicator indicating a user equipment type associated with a radio network temporary identity (RNTI), and setting the user equipment identifier type and the user equipment identifier as part of MAC PDU.

According to another aspect of the present invention, the user equipment type is used in determining radio resource settings of a radio bearer, and the user equipment identifier indicator is transmitted from the second protocol layer to the first protocol layer. Preferably, the user equipment identifier indicator is dynamically updated by control information of the third protocol layer when the user equipment type used in a radio communication network has changed.

According to another embodiment of the present invention, a radio communication system for identifying user equipment in a radio communication network comprises a plurality of protocol layers; means for providing data and a message type indicator from a RRC (radio resources control) layer to an RLC (radio link control) layer, wherein the message type indicator is associated with a user equipment identifier indicator; means for setting in the RLC layer the user equipment identifier indicator in response to the received message type indicator; means for providing the user equipment identifier indicator and the data to a MAC (medium access control) layer; and means for adding in the MAC layer a user equipment identifier type and a user equipment identifier to a header of a MAC SDU (medium access control service data unit) in response to the user equipment identifier indicator.

According to another embodiment of the present invention a radio communication system for identifying user equipment in a radio communication network comprises a plurality of protocol layers; means for providing data and a parameter associated with a user equipment identifier type indicator from a third protocol layer to a second protocol layer, wherein the third protocol layer is an upper protocol layer than the second protocol layer; providing the user equipment identifier indicator and the data from the second protocol layer to a first protocol layer; and adding in the first protocol layer a user equipment identifier type and a user equipment identifier to a first protocol layer data packet in response to the user equipment identifier indicator.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings. Hereinafter, a method for setting a user equipment identifier in accordance with the present invention will be described.

Initially, the use of each user equipment identifier (for example, C-RNTI, U-RNTI) will be described. First, in a radio communication network, a C-RNTI (Cell Radio Network Temporary Identity) is used when the data of a DTCH (Dedicated Traffic Channel) or a DCCH (Dedicated Control Channel) as a dedicated logical channel is transmitted to a common transport channel and when a DSCH (Downlink Shared Channel) is used as a common transport channel.

Second, a U-RNTI (UTRAN Radio Network Temporary Identity) is used when the data of a DCCH (Dedicated Control Channel) is transmitted to the common transport channel.

Accordingly, a user equipment identifier can be changed according to the type of the logical channel used. The user equipment identifier is preferably set in a MAC (Medium Access Control) layer. However, since the MAC layer cannot recognize what type of identifier is being used, it has to receive an identifier value from an RLC layer, wherein the RLC layer is an upper layer. To further illustrate, the RLC layer has to transmit a parameter indicating the type of a user equipment identifier (for example, "0" indicating the C-RNTI or "1" indicating the U-RNTI) with an RLC PDU (Radio Link Control Protocol Data Unit).

Figure 1:
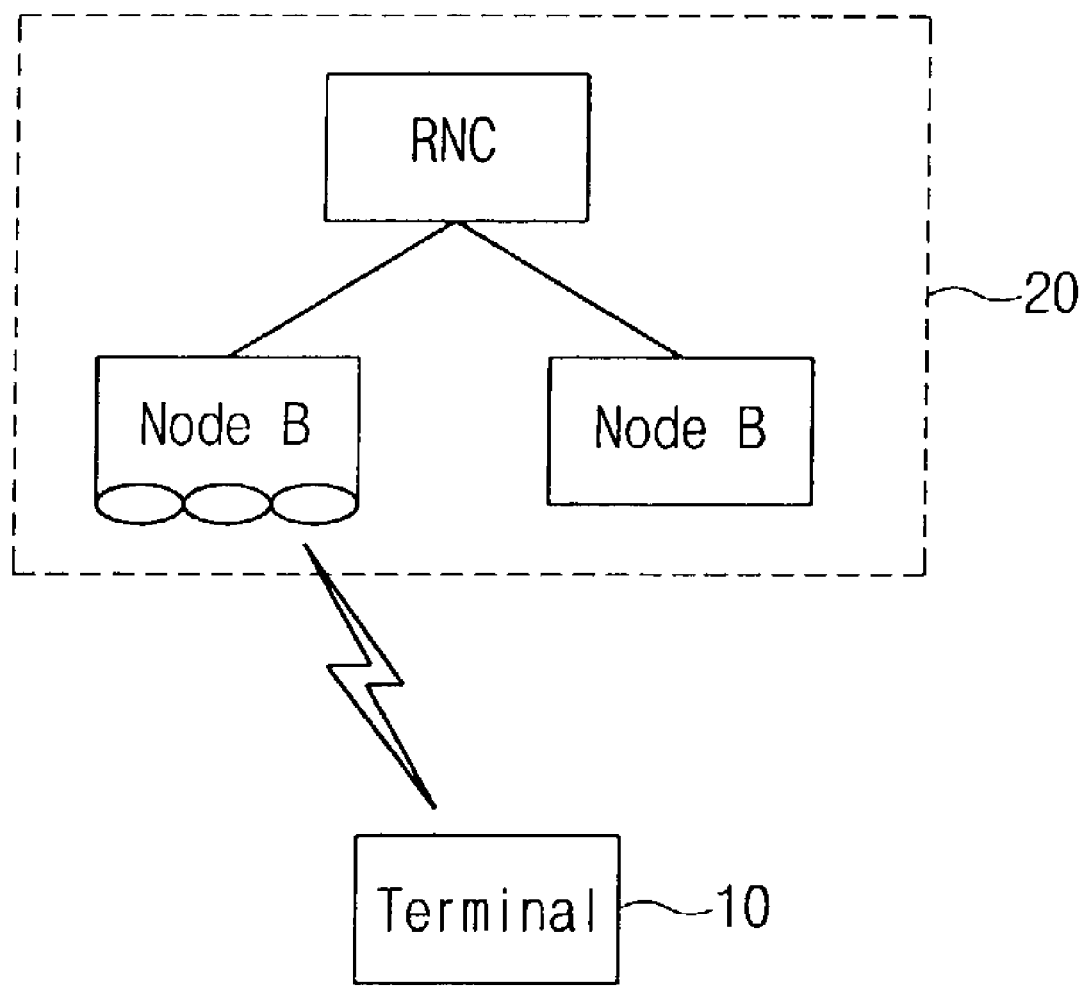
FIG. 1 illustrates a UTRAN (Universal Mobile Telecommunications Network Terrestrial Radio Access Network) structure according to a 3GPP (Third Generation Partnership Project) radio access network specification as applied to the conventional art and the present invention.
Figure 2:
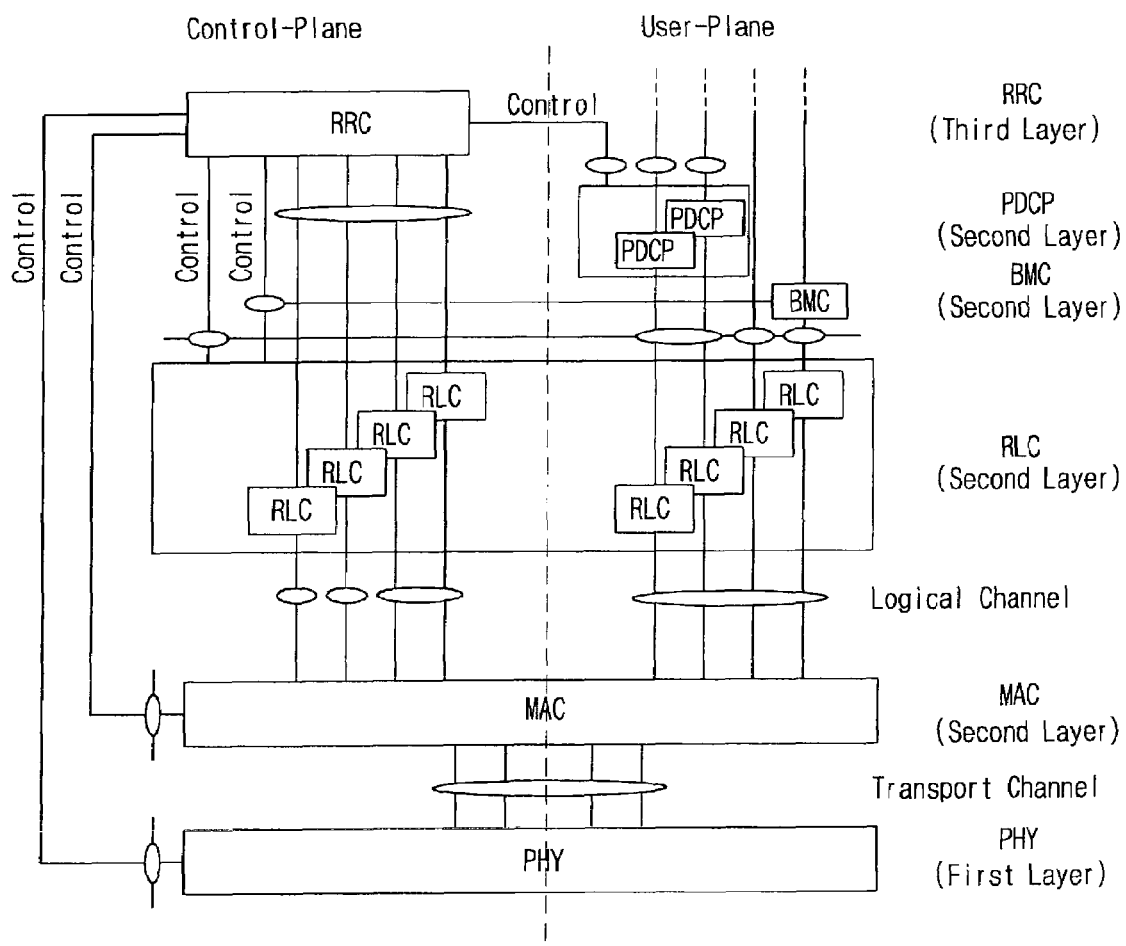
FIG. 2 illustrates a structure of a general radio interface protocol according to a radio access network specification provided by the 3GPP.
Figure 3:
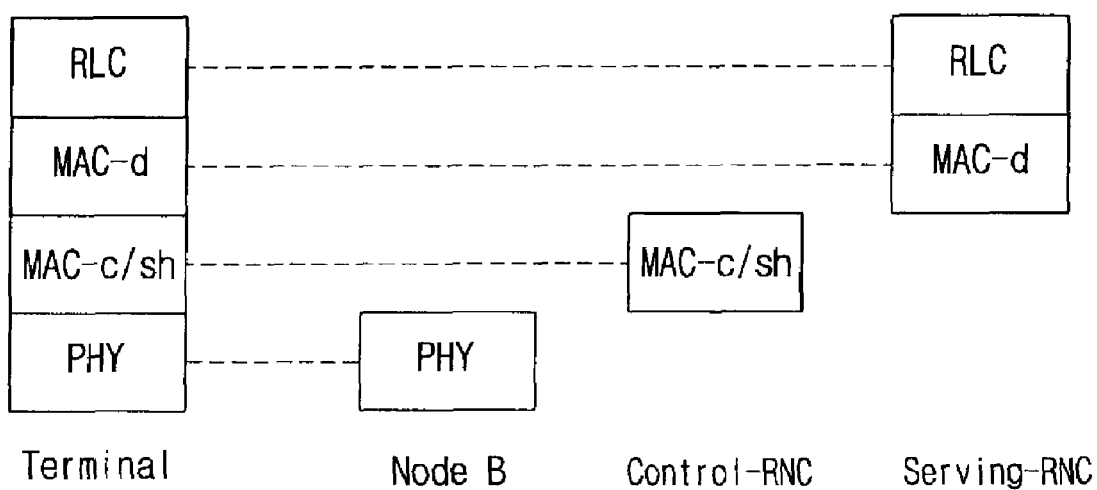
FIG. 3 illustrates an example of a protocol layer structured by radio access network construction elements.
Figure 4:
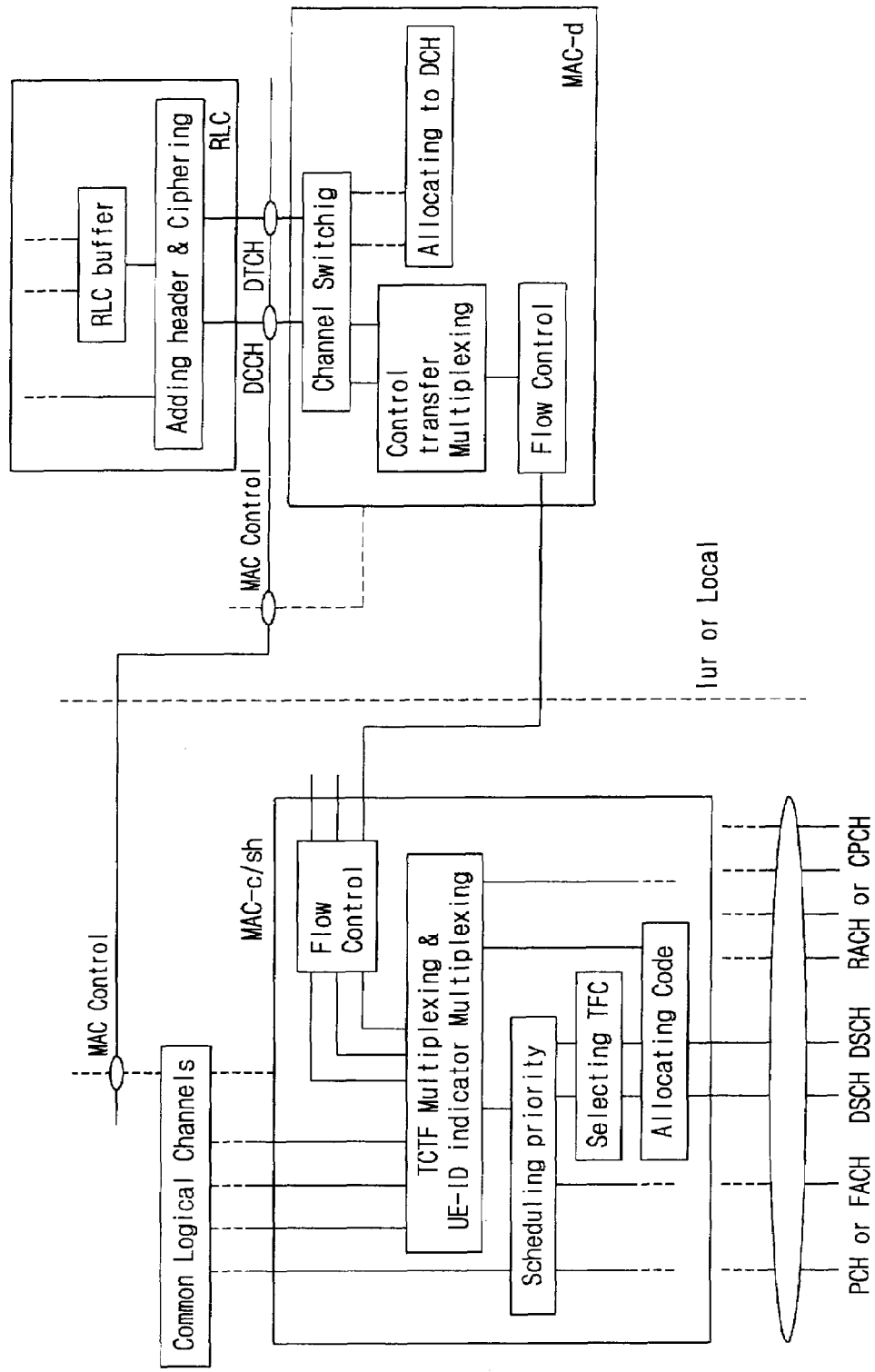
FIG. 4 illustrates a structure of an RLC (Radio Link Control) layer and a MAC (Medium Access Control) layer in the UTRAN side.
Figure 5:
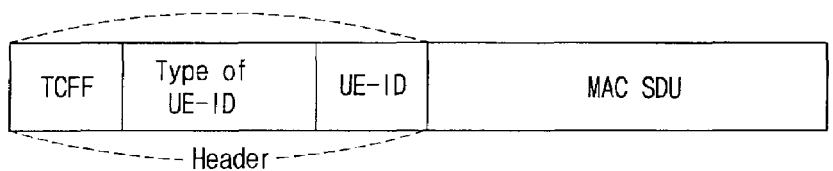
FIG. 5 illustrates a MAC PDU (Medium Access Control Protocol Data Unit)

As depicted in FIG. 5, when the parameter is referred to as a user equipment identifier indicator, a user equipment identifier type field in the MAC layer and a pertinent user equipment identifier indicated by a user equipment identifier indicator are added to a header of the MAC PDU which includes the RLC PDU transmitted from the RLC layer.

However, because the RLC layer entity cannot recognize the type of user equipment identifier being used, a user equipment identifier is preferably set by using the following two methods.

1. Static setting method—Determining the type of a user equipment identifier in setting a radio bearer.

In general, when a radio bearer is set, one or two logical channel is used in a certain RLC layer entity. That is, in most cases, one DCH(either DCCH or DTCH) is used for one RLC layer entity. In other cases, one DCCH can be added to transmit control information required for a DTCH transfer.

Accordingly, because a logical channel type is determined by setting a radio bearer, the type (U-RNTI or C-RNTI) of a user equipment identifier is also determined when setting a radio bearer. Once set, the user equipment identifier type is continually used until the setting of the radio bearer is changed.

In other words, an RLC layer indicates the same user equipment identifier to the MAC layer. When a need to change the type of the user equipment identifier arises, the setting of the radio bearer is changed, and accordingly a different type of user equipment identifier may be used.

2. Dynamic setting method—Determining the type of a user equipment identifier according to the type of transmitted message.

The static setting method described above may be simple to implement. However, the same type of a user equipment identifier is used with a certain radio bearer. For example, when a radio bearer is set to use U-RNTI (required 32 bits) for a case permitting using C-RNTI (required 16 bits), resource waste might arise in comparison with the use of C-RNTI.

Accordingly, with the preferred embodiment of the present invention, a method for distinguishing a case using U-RNTI information and a case using C-RNTI information and indicating the type of a user equipment identifier to be used in a MAC layer in transmission of pertinent information and for informing it to an RLC layer will be used.

As described above, since only C-RNTI is used when DTCH is used as a logical channel, the dynamic user equipment identification method according to the preferred embodiment of the present invention will be described in connection with the DCCH.

In general, the DCCH is a logical channel for transmitting control information transmitted from a RRC (radio resources control) layer. An RRC message includes information related to call setting, maintaining and releasing functions.

The RRC layer performs a function for supporting a call connection to prevent disconnecting during a user equipment transfer from one cell (or node) to another cell (or another node). In some cases, a C-RNTI value may vary. In that case, it is proper to use a U-RNTI as user equipment identifier information. However, in most cases, it is possible to identify a user equipment with a C-RNTI, and accordingly resource waste can be minimized by selectively choosing a particular type of a user equipment identifier.

In addition, only the RRC layer recognizes what user equipment identifier type (C-RNIT or U-RNTI) is required when during the transmission of a RRC message, and the RRC layer has to transmit a related parameter to the RLC layer.

The parameter is preferably called "message type indicator". For example, in the RRC layer, a message to be transmitted requires a U-RNTI. First, the RRC layer transmits an RLC SDU with a message type indicator indicating a U-RNTI. Then the RLC layer sets a user equipment identifier according to the message and transmits the set indicator with an RLC PDU to the MAC layer.

Alternatively, assuming a message to be transmitted in the RRC layer requires a C-RNTI, the RRC layer transmits an RLC SDU having a message type indicator indicting a C-RNTI. The RLC layer sets a user equipment identifier according to the message and transmits the set indicator with a MAC SDU (substantially the same as RLC PDU) to the MAC layer.

Figure 7:
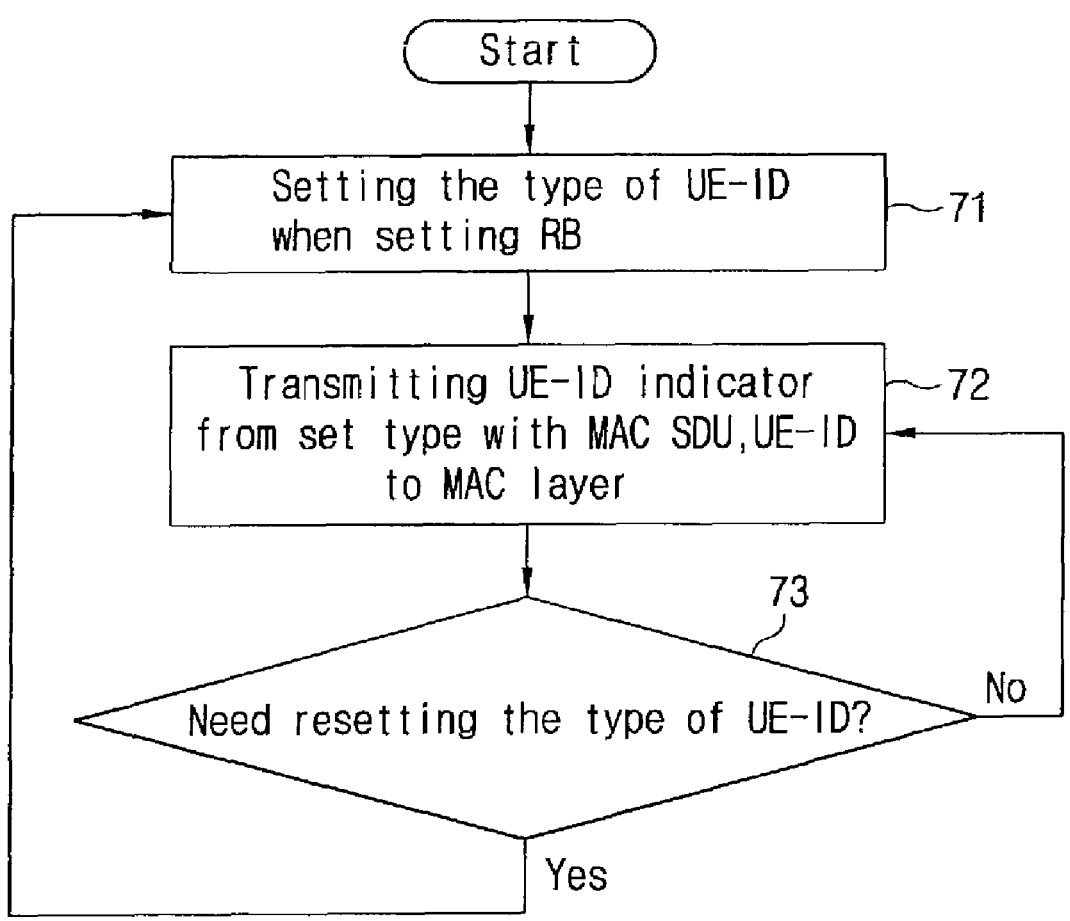
FIG. 7 is a flow chart illustrating a dynamic setting of a user equipment identifier indicator in accordance with the present invention.

FIG. 7 is a flow chart illustrating a static setting of the type of a user equipment identifier based on an embodiment of the present invention.

In setting a radio bearer, the RLC layer sets a user equipment identifier to be used, then transmits the set indicator to the MAC layer with a MAC SDU, and accordingly a user equipment identifier type field and a user equipment identifier field are set as shown in steps 71~73.

When the need arises, the user equipment identifier type is altered by changing the radio bearer setting as shown in steps 73 and 71.

Figure 6:
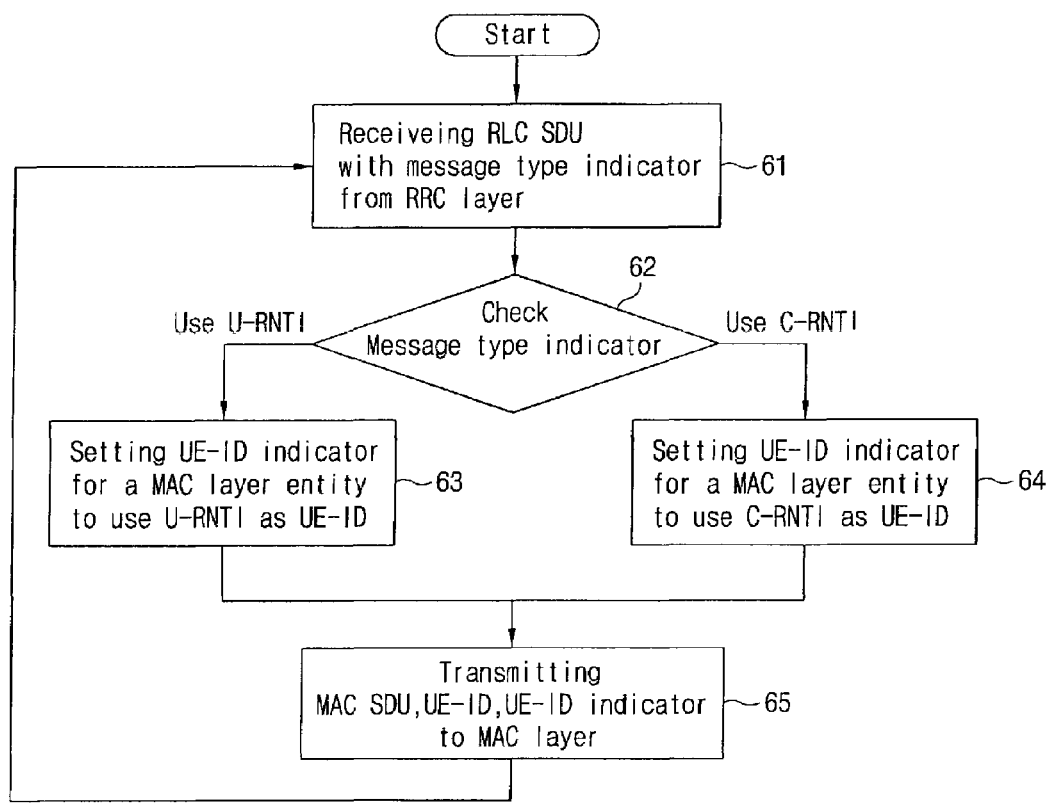
FIG. 6 is a flow chart illustrating a static setting of a user equipment identifier indicator in accordance with the present invention.

FIG. 6 is a flow chart illustrating a dynamic setting of the type of a user equipment identifier based on the preferred embodiment of the present invention.

It describes a dynamic determining method of the type of user equipment identifier in a Radio Access Network.

The RLC layer receives an RLC SDU and a message type indicator from the RRC layer as shown in step 61.

Afterwards, the RLC layer checks the message type indicator, judges which one (between a U-RNTI and a C-RNTI) is to be used in the transmission of a pertinent MAC SDU, sets a user equipment identifier indicator and transmits it to the MAC layer with the MAC SDU as shown in steps 62~65.

In the meantime, in steps 62~64, the RLC layer segments and reassembles the RLC SDU. The messages (usually not less than two) can either construct one RLD PDU, or several RLC PDUs can construct one message. In particular, when a plurality of messages form one RLC PDU, the type of user equipment identifier indicator used for each message can be different (for example, a first message may be associated with U-RNTI and a second message may be associated with C-RNTI). In that case, a user equipment identifier indicator is set to construct a header of a MAC PDU by using only a U-RNTI (32 bit) as a broader conceptual identifier.

In addition, when data of at least two types of RLC SDUs are included in one RLC PDU and the same type of user equipment identifier indicator is used for the SDUs, the same user equipment identifier indicator is transmitted to the MAC layer with the MAC SDU(substantially same as the RLC PDU).

Preferably, a message type indicator and a user equipment identifier indicator refers to the same thing. However, because segmenting and reassembling of an RLC SDU are performed on the RLC layer, a user equipment identifier indicator of the RLC PDU is set based on the message type indicator.

As described above, in the preferred embodiment of the present invention, data (RLC SDU) and a message type indicator as user equipment identification information are transmitted from the RRC layer to the RLC layer. Then the RLC layer sets a user equipment identifier indicator according to the transmitted message type indicator and transmits it to the MAC layer with the data, and appropriate user equipment identification information is added in the MAC layer.

Furthermore, when data transmitted or received through a dedicated logical channel is transmitted through a common transport channel and it is required to distinguish a user equipment by using a user equipment identifier, radio resource waste can be minimized by not setting one kind of user equipment identifier in a lump but setting an appropriate user equipment identifier as occasion demands.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

As the present invention may be manifested in several forms without departing from the spirit or essential characteristics thereof, it should also be understood that the above-described embodiments are not limited by any of the details of the foregoing description, unless otherwise specified. On the other hand, it should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method of identifying a user equipment (UE) in a radio communication system having a plurality of protocol layers, the steps comprising:
   receiving a user equipment identifier (UE-ID) type indicator from an upper protocol layer;
   providing the received user equipment identifier type indicator to a lower protocol layer, such that the lower protocol layer adds a UE-ID type, which indicated by the user equipment identifier type indicator, from among two or more UE-ID types and a UE-ID to a data packet for identifying the user equipment; and
   transmitting the data packet to a corresponding layer in a receiving device,
   wherein the upper protocol layer is a Radio Resource Control (RRC) layer, and the lower protocol layer is a Medium Access Control (MAC) layer.

2. The method of claim 1, wherein the steps are performed by a Radio Link Control (RLC) layer.

3. The method of claim 2, wherein the UE-ID type is altered according to an RLC SDU transmitted from an RRC layer to the RLC layer.

4. The method of claim 1, wherein the data packet is a MAC service data unit (SDU).

5. The method of claim 4, wherein a MAC protocol data unit (PDU) comprises the MAC SDU, the UE-ID type, and the UE-ID.

6. The method of claim 1, wherein the UE-ID type is used in determining radio resource settings of a radio bearer.

7. The method of claim 1, wherein the UE-ID type indicator is dynamically updated by control information of the upper protocol layer when a UE-ID type used in a radio communication network has changed.

8. The method of claim 1, wherein a parameter associated with the UE-ID type indicator is a message type indicator.

9. The method of claim 1, wherein the UE-ID type indicator distinguishes a UE appropriate to a network region to manage the UE in the radio communication system.

10. The method of claim 1, wherein the UE-ID type from among two or more UE-ID types allows a user equipment identifier to be changed according to the type of logical channel used.

11. A system for identifying a user equipment (UE) in a radio communication system having a plurality of protocol layers, the system comprising:
    means to receive a user equipment identifier (UE-ID) type indicator from an upper protocol layer;
    means to provide the received user equipment identifier type indicator to a lower protocol layer, such that the lower protocol layer adds a UE-ID type, which indicated by the user equipment identifier type indicators from among two or more UE-ID types and a UE-ID to a data packet for identifying the user equipment; and
    means to transmit the data packet to a corresponding layer in a receiving device,
    wherein the upper protocol layer is a Radio Resource Control (RRC) layer, and the lower protocol layer is a Medium Access Control (MAC) layer.

12. The system of claim 11, wherein the UE-ID type from among two or more UE-ID types allows a user equipment identifier to be changed according to the type of logical channel used.

13. A method for setting a user equipment identifier (UE-ID) in a radio communication system having a plurality of protocol layers, comprising the steps of:
    providing data and a parameter associated with a user equipment identifier type indicator from a Radio Resource Control (RRC) layer to a Radio Link Control (RLC) layer, wherein the RRC layer is an upper protocol layer than the RLC layer;
    setting in the RLC layer a user equipment identifier type indicator in response to receiving the provided parameter;
    providing the data and the user equipment identifier type indicator from the RLC layer to a Medium Access Control (MAC) layer;
    adding in the MAC layer a user equipment identifier type and a user equipment identifier to a MAC layer service data unit (SDU) in response to the user equipment identifier type indicator,
    wherein the user equipment identifier type indicator is used to indicate a type of the user equipment identifier (UE-ID) from among two or more user equipment identifiers (UE-IDs).

* * * * *